(12) United States Patent
Callaway et al.

(10) Patent No.: US 9,723,254 B2
(45) Date of Patent: Aug. 1, 2017

(54) METHOD AND SYSTEM OF EXTENDING RECORDING TIME FOR A RUN-OVER PROGRAM

(75) Inventors: Timothy E. Callaway, Laurel, MD (US); Sean S. Lee, Rockville, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1186 days.

(21) Appl. No.: 12/102,362

(22) Filed: Apr. 14, 2008

(65) Prior Publication Data

US 2009/0257732 A1    Oct. 15, 2009

(51) Int. Cl.
| | |
|---|---|
| H04N 5/74 | (2006.01) |
| H04N 5/775 | (2006.01) |
| H04N 21/426 | (2011.01) |
| H04N 21/433 | (2011.01) |
| H04N 21/44 | (2011.01) |
| H04N 21/442 | (2011.01) |
| H04N 21/458 | (2011.01) |
| H04N 21/462 | (2011.01) |
| H04N 21/472 | (2011.01) |
| H04N 21/488 | (2011.01) |
| H04N 21/84 | (2011.01) |

(Continued)

(52) U.S. Cl.
CPC ....... *H04N 5/775* (2013.01); *H04N 21/42692* (2013.01); *H04N 21/4334* (2013.01); *H04N 21/44008* (2013.01); *H04N 21/44209* (2013.01); *H04N 21/4583* (2013.01); *H04N 21/4622* (2013.01); *H04N 21/47214* (2013.01); *H04N 21/4884* (2013.01); *H04N 21/84* (2013.01); *H04N 21/8405* (2013.01); *H04N 21/41407* (2013.01)

(58) Field of Classification Search
CPC .......................... H04N 5/775; H04N 21/42692
USPC .......................................................... 386/83
See application file for complete search history.

(56) References Cited

U.S. PATENT DOCUMENTS

| | | | |
|---|---|---|---|
| 4,230,990 A | 10/1980 | Lert et al. | |
| 4,866,719 A | 9/1989 | Morgan et al. | |
| 4,967,273 A | 10/1990 | Greenberg | |

(Continued)

FOREIGN PATENT DOCUMENTS

| | | |
|---|---|---|
| EP | 1100268 A2 | 5/2001 |
| EP | 1244309 A1 | 9/2002 |

OTHER PUBLICATIONS

Final Rejection dated May 7, 2012 in U.S. Appl. No. 12/132,122, filed Jun. 3, 2008 by Sean S. Lee et al.

(Continued)

*Primary Examiner* — Anthony Brown
(74) *Attorney, Agent, or Firm* — Harness, Dickey & Pierce, PLC (57) ABSTRACT

A system and method of extending a recording time of a recording event within a receiving device is set forth. The receiving device includes a memory and a controller. The controller generates a recording event request for content having a start time and a first end time and begins to store content in a memory of the first receiving unit starting at the start time. The controller reviews a program associated characteristic of the content when the end time is reached and when the program associated characteristic corresponds to the content, changes the first end time to second end time later than the first end time.

15 Claims, 7 Drawing Sheets

(51) Int. Cl.
*H04N 21/8405* (2011.01)
*H04N 21/414* (2011.01)

(56) References Cited

U.S. PATENT DOCUMENTS

| | | |
|---|---|---|
| 5,200,822 A | 4/1993 | Bronfin et al. |
| 5,450,122 A | 9/1995 | Keene |
| 5,649,283 A | 7/1997 | Galler et al. |
| 5,937,331 A | 8/1999 | Kalluri et al. |
| 6,243,145 B1 | 6/2001 | Schlarb et al. |
| 6,397,039 B1 | 5/2002 | Butte et al. |
| 6,604,224 B1 | 8/2003 | Armstrong et al. |
| 7,712,123 B2 | 5/2010 | Miyaoku et al. |
| 2002/0054068 A1 | 5/2002 | Ellis et al. |
| 2002/0174438 A1 | 11/2002 | Cleary et al. |
| 2003/0005457 A1 | 1/2003 | Faibish et al. |
| 2003/0028890 A1 | 2/2003 | Swart et al. |
| 2003/0051252 A1 | 3/2003 | Miyaoku et al. |
| 2003/0208767 A1 | 11/2003 | Williamson et al. |
| 2004/0040035 A1* | 2/2004 | Carlucci et al. .......... 725/32 |
| 2004/0244036 A1 | 12/2004 | Wright |
| 2004/0255325 A1 | 12/2004 | Furui et al. |
| 2005/0010944 A1 | 1/2005 | Wright et al. |
| 2005/0015816 A1 | 1/2005 | Christofalo et al. |
| 2005/0060754 A1 | 3/2005 | Simyon |
| 2005/0278747 A1* | 12/2005 | Barton et al. .......... 725/58 |
| 2006/0026648 A1 | 2/2006 | Kirihara et al. |
| 2006/0117365 A1 | 6/2006 | Ueda et al. |
| 2006/0195886 A1 | 8/2006 | Ashley |
| 2007/0040934 A1 | 2/2007 | Ramaswamy et al. |
| 2007/0058949 A1* | 3/2007 | Hamzy et al. .......... 386/112 |
| 2007/0124789 A1 | 5/2007 | Sachson et al. |
| 2008/0015966 A1* | 1/2008 | Altius .......... 705/37 |
| 2008/0112686 A1* | 5/2008 | Chen et al. .......... 386/83 |
| 2008/0115171 A1 | 5/2008 | Barsness et al. |
| 2008/0172693 A1 | 7/2008 | Ludvig |
| 2008/0232782 A1 | 9/2008 | Kanemaru et al. |

OTHER PUBLICATIONS

Non-final Office action dated Dec. 6, 2011 in U.S. Appl. No. 12/132,122, filed Jun. 3, 2008 by Sean S. Lee et al.
Final Rejection dated Jul. 14, 2011 in U.S. Appl. No. 12/132,122, filed Jun. 3, 2008 by Sean S. Lee et al.
Non-final Office action dated Feb. 7, 2011 in U.S. Appl. No. 12/132,122, filed Jun. 3, 2008 by Sean S. Lee et al.
Chilean Office action received Jul. 12, 2010 in Chilean Patent Application No. 1350-2009 filed Jun. 3, 2009 by Sean S. Lee et al.
Isnardi, Michael; "ATSC Program and System Information Protocol (PSIP)"; Sarnoff Corporation; Oct. 18, 2000; pp. 9-12.
Non-final Office action dated Apr. 30, 2009 in U.S. Appl. No. 11/728,552, filed Mar. 26, 2007 by Daniel M. Miner.
Non-final Office action dated Jan. 17, 2013 in U.S. Appl. No. 12/132,122, filed Jun. 3, 2008 by Sean S. Lee et al.
Final Rejection dated Jun. 17, 2013 in U.S. Appl. No. 12/132,122, filed Jun. 3, 2008 by Sean S. Lee et al.
Notice of Allowance dated Oct. 9, 2013 in U.S. Appl. No. 12/132,122, filed Jun. 3, 2008 by Sean S. Lee et al.

\* cited by examiner

FIG. 9

METHOD AND SYSTEM OF EXTENDING RECORDING TIME FOR A RUN-OVER PROGRAM

TECHNICAL FIELD

The present disclosure relates generally to recording broadcast programming and, more specifically, to a method and system for extending the end time of a recording when the program runs longer than the originally allotted time period.

BACKGROUND

The statements in this section merely provide background information related to the present disclosure and may not constitute prior art.

Recording video content on a recording device such as a digital video recorder is commonplace. A digital video recorder may record content according to a predetermined start time and a predetermined end time for a particular recording event. Digital video recorders may also be automatically programmed to record content that corresponds to the preferred attributes of the device owner. The automatically programmed content is also recorded at times corresponding to a predetermined start time and end time. The start time and end time of the automatically programmed content may be determined from a program guide.

Live events are often broadcasted and can sometimes extend beyond their predetermined end time. Various types of content including sporting events, concerts and other live events such as award shows have the potential to extend beyond their predetermined end time. In the case of a sporting event, the most exciting portions of the event may take place at the very end. Thus, when the digital video recorder records such material, the pre-determined end time is reached and the recording is stopped. Thus, the end of the event is not recorded.

SUMMARY

The present disclosure may be used to extend the recording time of a live event beyond the predetermined time so that the ending of the event is recorded. The present disclosure may also be used to change the end time forward in the case of a sporting event ending early, such as a weather-cancelled or shortened baseball game.

In one aspect of the disclosure, a method includes generating a recording event request for content having a start time and a first end time, begin storing content in a memory of the first receiving unit starting at the start time, when the recording device reaches the end time, reviewing a program associated characteristic of the content and when the program associated characteristic corresponds to the content, changing the first end time to second end time later than the first end time.

In another aspect of the disclosure, a method includes generating a recording event request for content having a start time and a first end time, begin storing content in a memory of the first receiving unit starting at the start time, reviewing a program associated characteristic of the content and when the program associated characteristic corresponds to the content, changing the first end time to second end time different than the first end time.

In a further aspect of the disclosure, a receiving device includes a memory and a controller. The controller generates a recording event request for content having a start time and a first end time and begins to store content in a memory of the first receiving unit starting at the start time. The controller reviews a program associated characteristic of the content when the end time is reached and when the program associated characteristic corresponds to the content, changes the first end time to second end time later than the first end time.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP)

delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Figure 1:
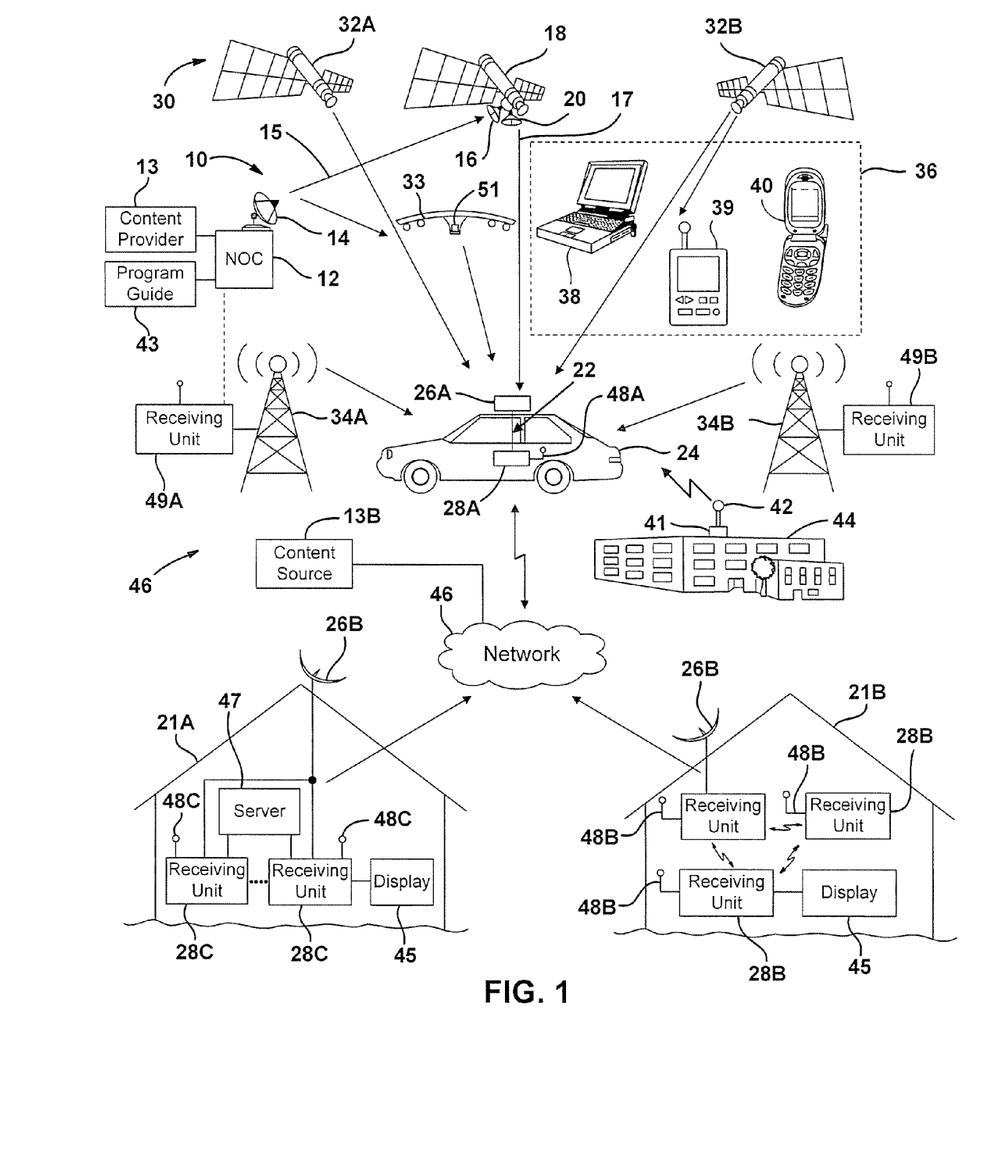
FIG. 1 is a block diagrammatic system view of a communication system according to the present disclosure.

Referring now to FIG. 1, a satellite television broadcasting system 10 is set forth in the following example. The satellite television broadcasting system 10 includes a network operations center 12 in communication with various content providers 13. Various programming content may be provided from the content providers 13 including movies, sporting events and the like. The content providers 13 may provide live feeds as well as recorded material. The content providers may thus provide signals or media.

The network operations center 12 generates wireless communication signals 15 through a transmitting antenna 14 which are received by a receiving antenna 16 of a high altitude device such as a spaced-based satellite 18. The wireless communication signals, for example, may be digital, digital video, data or digital audio. As will be described below, the wireless communication signals may be entertainment content, live content, traffic, weather, hazardous material warning areas or advertising marketing. The wireless signals 15 may be referred to as uplink signals.

Wireless communication signals 17 such as downlink signals may be generated from the satellite 18 and may include location-specific signals with location information therein. The location information may correspond to a geographic area in which the location specific information is valid or suitable for. A transmitting antenna 20 or the satellite 18 communicates the downlink signals 17 to various receiving systems including stationary systems such as those in homes 21A, 21B or buildings 44 as well as mobile receiving systems 22. The wireless signals may have various types of information associated with them including location information. The wireless signals may also have various video and audio information associated therewith.

The mobile receiving system 22 is disposed within an automotive vehicle 24. Several mobile systems 22 may be incorporated into a network. The mobile receiving system 22 includes a receiving antenna 26A that receives the wireless signals 17 from the satellite 18 and processes the signals in a receiving unit 28A. The mobile receiving unit 28 will be further described below. The receiving unit 28 may include a network antenna 48A.

The network antennas 48A may be antennas suitable for communicating with other receiving units in a network 46. The vehicle 22 may represent a node of the network 46. The network 46 may be various types of wireless networks such as an 802.11a/b/g wireless network. Other types of networks may be a WiMax network. The network may also comprise terrestrial components or a combination of terrestrial and satellite components. The network may contain both mobile and stationary receiving units.

The network 46 may be referred to as a mesh network. The receiving units within the network 46 are only capable of communicating a certain distance. Thus, mobile receivers may enter and leave the range of other receivers. Thus, at any given time the network make-up may change.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. The towers 34 may also be cellular phone, radio or TV towers generating location signals. Cellular phones typically include a GPS locating system. As the vehicle 24 or mobile devices move, the exact coordinates in latitude and longitude may be used to determine the proper area of interest such as a designated marketing area which will control the mobile device's choices for local television, advertising and other broadcasted data.

Each of the cellular towers 34A and 34B may include respective receiving units 49A and 49B used to receive signals from the satellite and also receives signals from the network. The receiving units 49A, 49B may be referred to as stationary receiving units. The stationary receiving units 49A, 49B may form nodes of the network 46. The receiving units 49A, 49B may also terrestrially receive signals from the network operations center 12 through a wired or wireless connection. The towers 34A, B may redistribute the content to the other receiving units.

In addition, the satellites 18 may also be replaced with another high altitude device such as a stratospheric platform 33 for transmitting content to the mobile device, transmitting communication signals, transmitting lost content segments and transmitting location-specific signals. Stratospheric platforms 33 are manned or unmanned airplanes, airships, or the like that fly above commercial airspace. It is envisioned that stratospheric platforms may fly at altitudes between 60,000 and 100,000 feet from the surface of the earth. Thus, the stratospheric platforms are in a significantly lower position than even low earth orbit satellites.

The stratospheric platforms 33 may also include a receiving unit 51 that is used to receive signals from the satellite 18 and communicate signals through the network 46. The receiving unit 51 may be referred to as a stationary unit since the stratospheric platform maintains a particular position above the earth. The receiving unit 51 may also become part of the wireless network 46 and thus be used to transfer content segments or packets to another node of the device. The receiving units 49A, 49B and 51 may also be referred to as nodes of the network 46.

The present invention may also be used for displaying and communicating various wireless communication signals on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Each of the personal mobile device 36 may also be a node within the network 46. That is, each of the personal devices may be used to communicate content segments or packets to other devices in the node.

A building 44 having a receiving unit 41 with an antenna 42 may be used as a node of the network 46. The receiving unit 41 may be referred to as a stationary unit. The receiving unit 41 may be in communication with the satellite 18 and with the network 46. For a dedicated network node, the receiving unit 41 may be operated by the operator of the content distribution system.

The home 21A may include user receiving units 28C that are in communication with a server 47. Each receiving unit 28C and/or server 47 may communicate with the satellite through the antenna 26B. Each receiving unit 28C may also be in communication with a display 45 such as a television. Each receiving unit 28C may be associated with a display 45. Only one of which is shown for simplicity. The receiving unit 28C may be wirelessly in communication with the server 47 or a wired communication with server 47. An antenna 48C may be used by each receiving unit 28C to wirelessly be communicated if the system is so equipped.

The home 21B illustrates a plurality of receiving unit 28B that form a network but may also be in communication with the network 46. Both homes 21A and 21B may form separate networks that may or may not be in communication with the outside network 46. The receiving unit 28B may include network antennas in 48B. Each user device 48B may be in communication with the satellite antenna 26C. Of course, satellite antennas 26B and 26C may include multiple antennas. Each receiving unit may also be associated with a display 45. Only one display 45 is illustrated in each home 21A, 21B for simplicity.

A program guide system 43 may provide content guide information to the network operation center 12. The program guide system 43 organizes data available regarding the programming channels and organizes them for ultimate transmission to the receiving devices including 28A-C and 49A-B. The receiving devices may receive the program guide data and display a grid guide in response thereto. The program guide data may be referred to as program objects. The program object may also include identifiers for the type of program (movie, sports, series), a series or short identifier and an episode number for a series. As will be further described below, a content identifier, a Tribune Media Services® ID, a program information packet or another identifier may be used as an identifier for a particular program. These may be found in the data corresponding to the program guide system 43. The same or equivalent program or event may have the same or similar packet identifier, program-associated data, Tribune Media Services® ID or content identifier.

Figure 2:
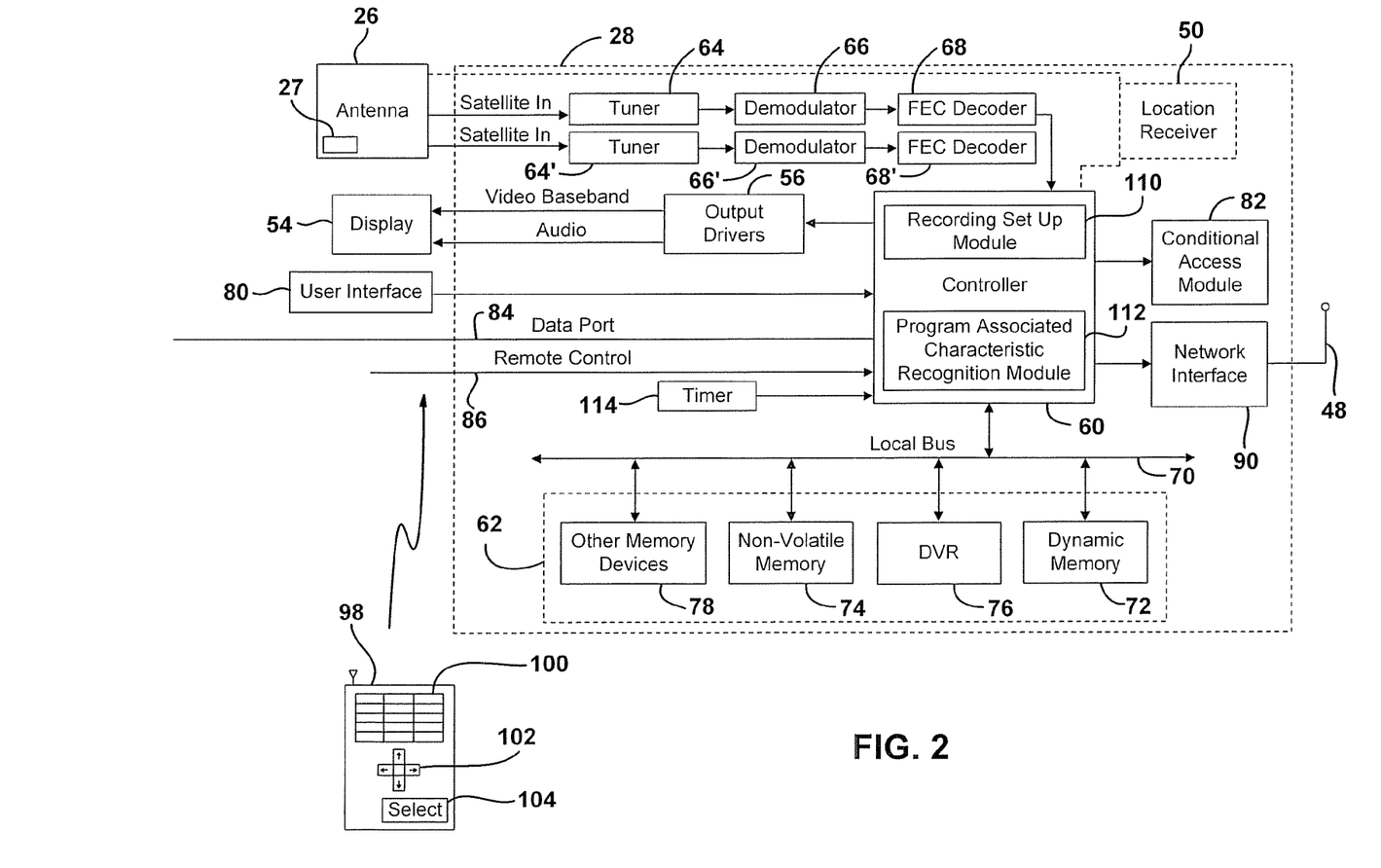
FIG. 2 is a detailed block diagrammatic view of a receiving unit of FIG. 1.

Referring now to FIG. 2, the various receiving units described above are collectively referred to as receiving unit 28 which is illustrated in further detail. The stationary receiving units 41, 49A, 49B, 51 and the personal mobile devices may also be configured in a similar manner to that of the receiving units 28. The receiving units may also be referred to as receiving devices or user devices. Antenna 26 may be various types of antennas including a rotating antenna which is used to track the relative movement of the satellite or other transponding device with respect to a vehicle. The antenna 26 may be a single antenna used for satellite television reception, or a number of antennas such as one for receiving television signals and one coupled to a location receiver 50 such as GPS receiver if used in a mobile device. The antenna 26 may also be an electronic antenna. The antenna 26 may include an internal controller 27 that controls the operation of the antenna 26. The stationary receiving units 28B, 28C, 41, 49A, 49B and 51 units may include a stationary antenna rather than a tracking antenna.

The location receiver 50 may be integrated into the receiving device 28 or outside the device. The location receiver 50 may be a GPS receiver. In a preferred embodiment, only one location receiver 50. However, the location receiver 50 may be external to the receiving unit such as part of the vehicle 24 or other part of the mobile receiving system. A controller 60 may be coupled directly to location receiver 50.

The location receiver 50 is capable of providing latitude and longitude to the controller 60. The controller 60 may be used to compare the location signals from the location receiver 50 to the boundaries of the areas of interest such that the mobile device can determine which areas of interest it is within and which areas of interest it is not within. From this determination it can control the receiving unit behavior such as allowing or disallowing display of certain audio or video channels or advertising or the like. The stationary receiving units 41, 49A, 49B and 51 units may not include the location receivers 50, 52.

The receiving unit 28 includes a display 54 associated therewith. The display 54 may be incorporated into the unit 28 or may be external to the receiving unit such as part of a vehicle 24 or television. The display 54 may have output drivers 56 used for generating the desired audio and video outputs suitable for the particular display 54. The stationary receiving units 28B, 28C, 41, 49A, 49B and 51 units may or may not include a display 54.

A controller 60 may be a general processor such as a microprocessor. The controller 60 may be used to coordinate and control the various functions of the receiving unit 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DIRECTV® set top boxes which employ a chip-based multifunctional controller.

It should be noted that more than one tuner 64, demodulator 66 and forward error correction decoder 68 may be provided in the system. In this example, a second tuner 64', a second demodulator 66' and a second forward error correction decoder 68' may be provided in the receiving unit 28. Of course, various numbers of tuners may be incorporated into a receiving unit 28. The system may be scalable in that a cluster or network may consist of a few receiving devices within a building such as a house or dozens or hundreds of devices. Because massive amounts of bandwidth may be available in the near future, clusters may be able to communicate with each other to share programs is realistic. Constraints now include the amount of bandwidth available. Further, each receiving device does not necessarily need to be in communication with a satellite. Some user devices merely may receive information directly from another user receiving device. Further, clusters of devices may include a service provider supported cluster that is used to provide material. For example, the building 44 may be a network operator supported building that may provide content to other users within the network 46. The methods described below may be used to transfer the content to the various devices.

The controller 60 may include or be coupled to a local bus 70. The local bus 70 may be used to couple a memory including dynamic memory 72 such as RAM which changes often and whose contents may be lost upon the interruption of power or boot up. The bus 70 may also be coupled to a non-volatile memory 74. The non-volatile memory 74 may be an in-circuit programmable type memory. One example of a non-volatile memory is an EEPROM. One specific type of EEPROM is flash memory. Flash memory is suitable since it is sectored into blocks of data segments that may be individually erased and rewritten.

A digital video recorder (DVR) 76 may also be coupled to the local bus 70. The digital video recorder 76 may be within the receiving device 28 or coupled to the receiving device.

Other memory devices 78 may also be coupled to local bus 70. The other memory devices may include other types of dynamic memory, non-volatile memory, or may include such devices such as a digital video recorder. The display 54 may be changed under the control of controller 60 in response to the data in the dynamic memory 72 or non-volatile memory 74. Part of the memory 62 may be used as a buffer.

The controller 60 may also be coupled to a user interface 80. User interface 80 may be various types of user interfaces such as a keyboard, push buttons, a touch screen, a voice activated interface, or the like. User interface 80 may be used to select a channel, select various information, change the volume, change the display appearance, or other functions. The user interface 64 is illustrated as part of the receiving unit 28. However, should the unit 28 be incorporated into a vehicle, the user interface 80 may be located external to the mobile receiving unit such as dial buttons, voice activated system, or the like incorporated into the vehicle and interface with the receiving unit.

A conditional access module 82 (CAM) may also be incorporated into the receiving unit. The access module 82 may include software to allow the receiving unit 28 access to various channels and wireless signals generated by the system. Not having an access card or not having an up-to-date access card 82 may prevent the user from receiving or displaying various wireless content from the system.

One user interface is a remote control device 98 having a key pad 100, an arrow key pad 102, and a select button 104 may also be provided. Inputs to the receiver 28 may be provided by the remote control device 28 or through another type of user interface 80.

The receiving unit 28 may include a network interface 90 for interfacing with other nodes of the network. The antenna 48 is used to communicate with other nodes of the network. The network interface 90 may be various types of communication cards such as an 802.11a/b/g wireless communication card, a WiMax card, or other types of wireless devices.

The controller 60 may include a recording setup module 110 that is used for recording various programming events on the digital video recorder 76. The recording setup module 110 may be programmed to record various programs based upon personal preferences or by directly selecting various content to be recorded. Live events, as well as pre-recorded events, may be recorded using the recording setup module 110. During the setup process, the start time and a finish time are established for the recording event. The end time for a live event, such as a sporting event, awards program or other types of events, may vary depending on the various conditions. For example, various sporting events may include an overtime or extended periods that may be played during a tie. A baseball game may have a slight rain delay or postponement and thus the end time may be extended. The end time may also be shorter than the originally-planned end time due to a weather-related event such as in a baseball game when the game is called early due to inclement conditions.

The present disclosure is used to adjust the predetermined end time based on characteristic recognition associated with various programming content. The control 60 may include a program-associated characteristic recognition module 112. The program-associated recognition module 112 is used for changing the end time of a recording event due to characteristics of the program. A program-associated identifier, visual cues within the video, a pattern of the broadcast stream and close-captioning data may be monitored in various combinations, altogether or individually. The details for recognizing the end of an event being extended is set forth below. It should be noted that the modules 110 and 112 may also be physically present in the DVR 76 rather than in controller 60. The DVR 76 may also be a separate component attached to the receiving unit 28.

A timer 114 may be included in the receiving unit 28 for timing various events such as determining the end time of a recording event. Again, the timer 114 may also be included within the DVR 76.

Figure 3:
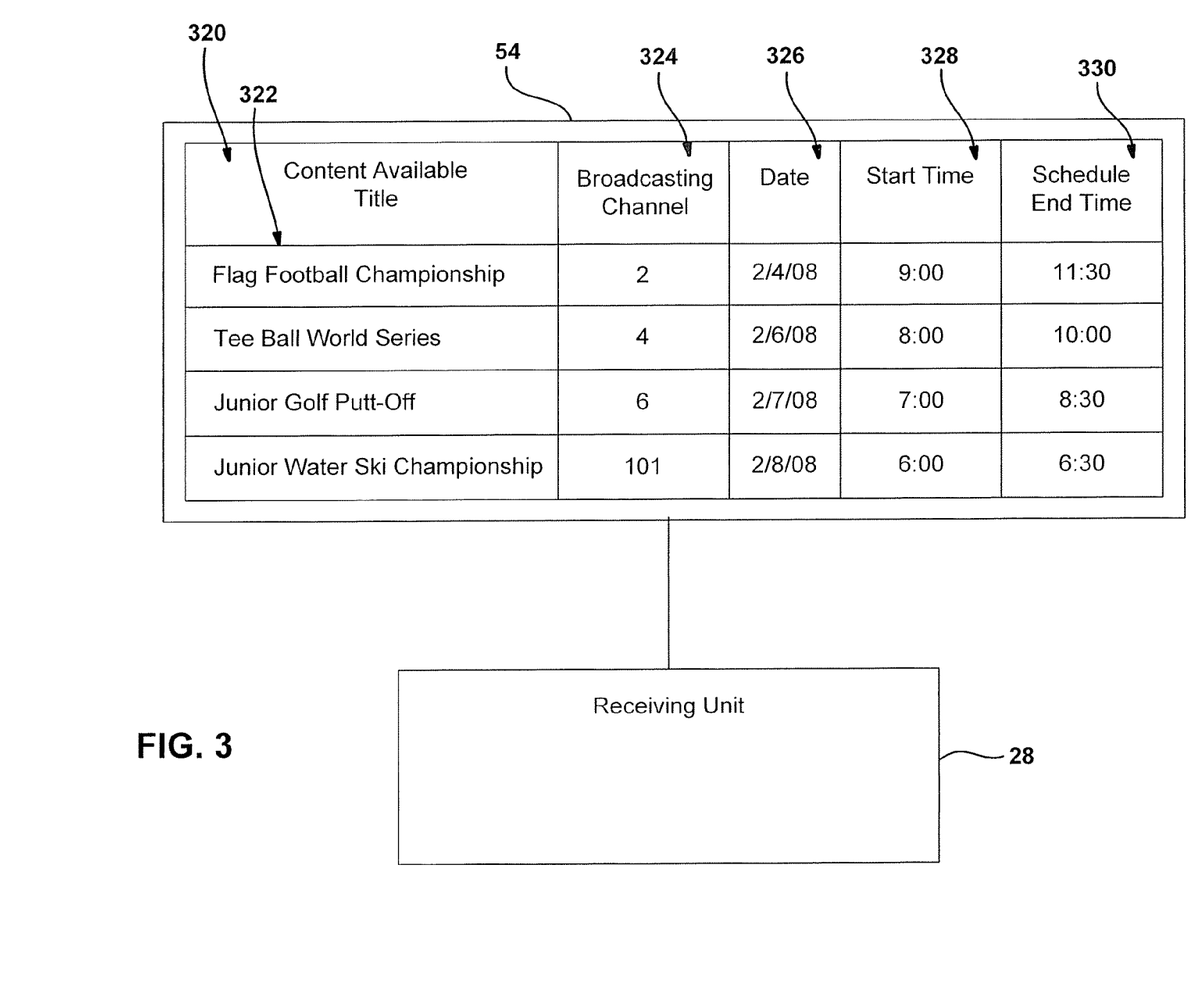
FIG. 3 is a screen display illustrating various content available to be recorded.

Referring now to FIG. 3, a receiving unit 28 is illustrated with display 54 illustrating a screen display 320. The screen display 320 may be generated by the receiving unit 28 for displaying content that may be recorded. The display may be lists or provide the list in a grid guide format. The screen display 320 may include content available titles in column 322. As illustrated, line 1 includes flag football championship, line 2 includes T-ball World Series, line 3 includes junior golf putt-off and line 4 includes junior water ski championship.

The screen display 320 may also include a column 324 for broadcasting channel which may include a logo or other information in the program guide. Call letters or an abbreviation for the network may also be provided in the broadcasting channel column 324. A date column 326 may also be provided. The date column 326 may be used to convey the date that the particular program was broadcast.

The screen display 54 may also include a start time column 328 and a scheduled end time column 330. It should be noted that a grid guide format may also convey the same information in blocks. That is, the grid guide may include programming events arranged by channel in various rows which include a start time and an end time. As will be described below, the end time may be a scheduled end time which may be adjusted according to the present disclosure.

Figure 4:
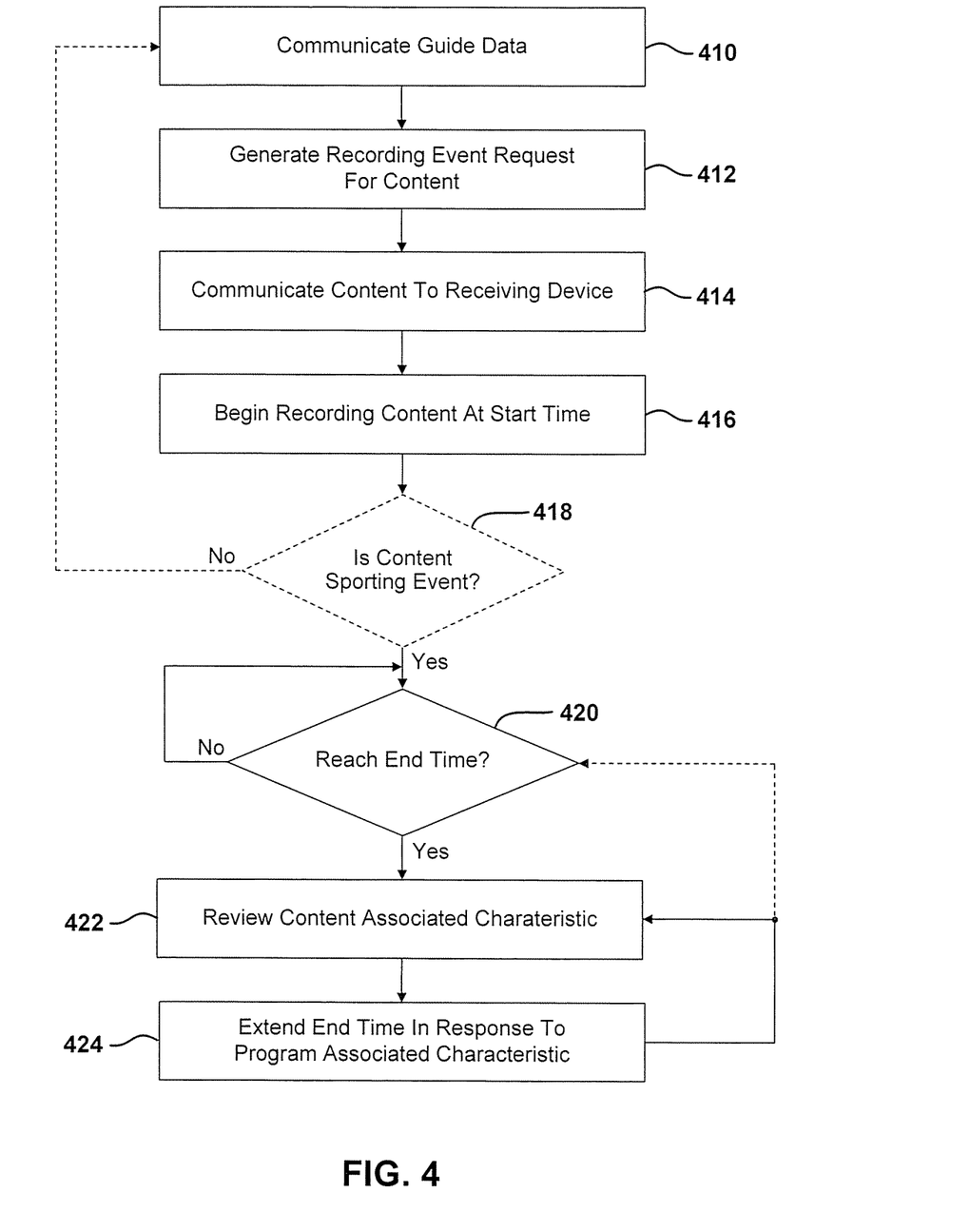
FIG. 4 is a flowchart of a method of extending the end time for a recording event.

Referring now to FIG. 4, a method for changing the end time of a recording event is set forth. It should be noted that the present system may be used with various types of broadcasting systems. Broadcasting systems, as mentioned above, may be cable, Internet, or other wired or wireless connections. Program guide data and program content may be communicated to receiving devices using different means.

In step 410, guide data is broadcast to various receiving devices. In step 412, a recording event request for content is generated. The recording request event may be generated automatically due to preferences set within the recording device or may be programmed individually by a user. The recording request may also be generated remotely through an Internet connection, mobile phone or other device.

After step 412, step 414 communicates content to the receiving device. The content may be communicated in various methods including through the Internet, through a network, or through a satellite. The order of the steps may be changed. For example, the content may be communicated to the device continually.

In step 416, the recording content corresponding to the recording event may be started at the predetermined start time.

The present disclosure may be used for sporting events and non-sporting events. For a sporting event configuration, a sporting event may be determined in step 418. If the content does not correspond to a sporting event, step 410 may be repeated. In step 418, if the content corresponds to a sporting event, step 420 may be performed. Step 418 is an optional step.

In step 420, it is determined whether the predetermined end time has been reached. If the end time has not been reached, step 420 is repeated. In step 420, if the end time has been reached, step 422 is performed. In the case of shortening an end time, this step may be eliminated.

Figure 5:
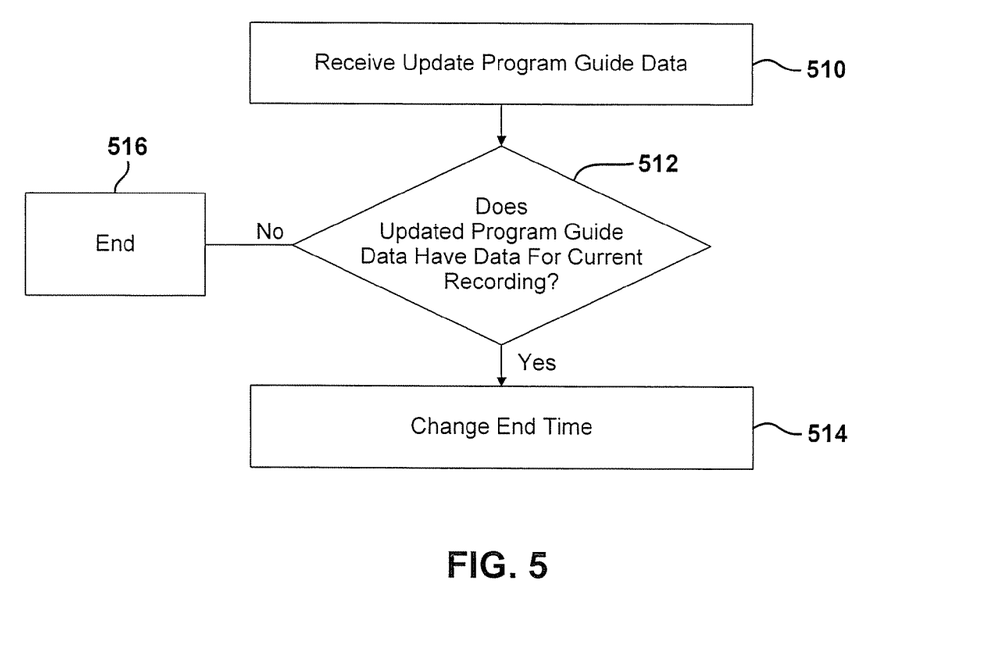
FIG. 5 is a flowchart of a method for extending the end time of a recording event in response to guide data.
Figure 6:
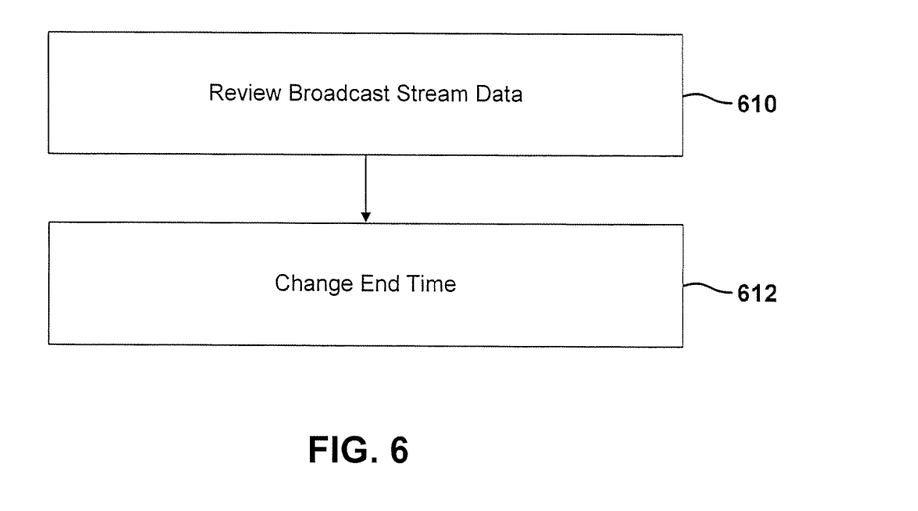
FIG. 6 is a flowchart of a method for extending an end time of a recording event based upon broadcast stream data.
Figure 7:
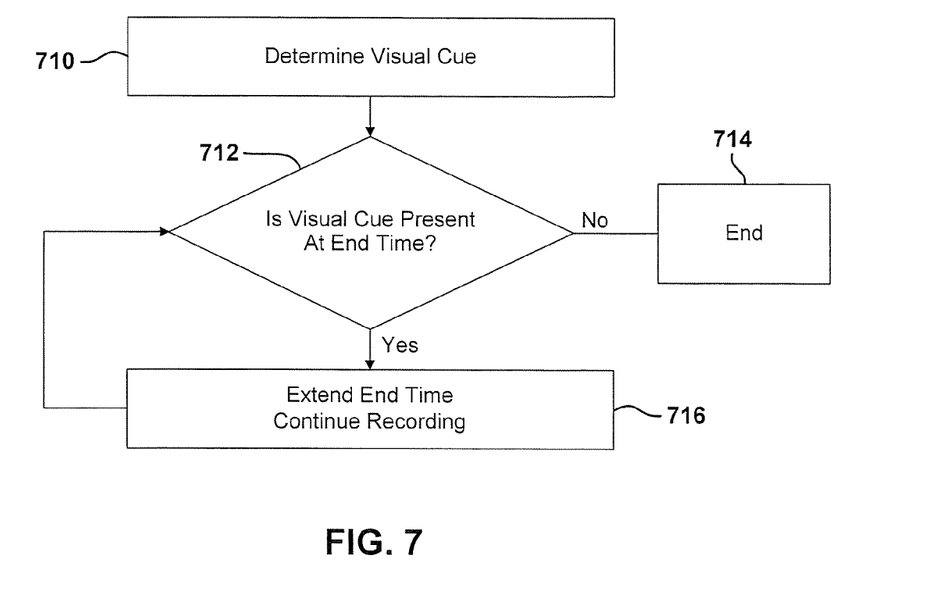
FIG. 7 is a flowchart of a method of extending a recording time based upon a visual cue.

In step 422, a content-associated characteristic is determined from the content stream. The content-associated characteristics may be a variety of associated characteristics including combinations of associated characteristics. Examples of suitable characteristics include guide information that is associated with the event, visual cues within the video of the event, a pattern of the video broadcast stream of the event, and closed-captioning data associated with the event. In FIGS. 5-7 below, details of each of the different types of monitoring are set forth.

In step 424, the predetermined end time of the recording event is extended in response to the program-associated characteristic or characteristics. The end time may be extended in predetermined time or the associated characteristics may be continually reviewed to determine when the end of the program is reached. Thus, steps 422 and 424 may be repeated continually. If a predetermined end time is set, steps 420-424 may be repeated rather than just steps 422-424.

Referring now to FIG. 5, the use of guide information may be performed in various manners. In one embodiment, guide or updated program guide data may be received in step 510. By receiving the updated program guide data, the receiving device determines whether the program guide data for the current recording event has been updated or changed in step 512. If the current program event has not been updated, step 512 ends the process. In step 512, if the program guide data has been changed for the current recording event, step 514 changes the end time. It should be noted that the end time of a particular event may not be certain. Thus, numerous changes to a recording event end time may be performed at different times.

The updated guide information may correspond to various types of information individually or in combination including the program title, program description, category names for different sports, program and various other types of program identifiers. Sports and sporting events may be identified by a sporting event category. The program guide information may be updated by the program guide module associated with the network operation center 12 illustrated in FIG. 1. The updated program guide data may be communicated.

Referring now to FIG. 6, data that is broadcasted with the content may also be reviewed in step 610. The simplest form of broadcast monitoring is monitoring a discrete signal that indicates the actual end of a broadcasted program and the start of another. Other examples include category names, the particular programming event, program identifiers and the like that are broadcasted with the actual content signal which may also be monitored. In step 612, the end time of a recording event may be changed if the data in the broadcasting data stream is not changed. For example, if the same program identifier is still being broadcasted on a particular channel, then the end time may be extended until the program identifier is changed.

Referring now to FIG. 7, in step 710 visual cues may also be used for extending the recording event end time. Various types of visual cues, especially for sporting events, may be used. For example, sporting events typically include a play clock or game clock. Thus, if a game clock is still ongoing, the game clock will continue to be displayed and the end time may be extended. Another example of a visual cue is that a typical camera perspective of a sporting event toward the field of play may also be used. For example, football has a large field of green that takes on a percentage of the screen. The players are static before a snap of a ball with a vertical line of colors to either side surrounded by a circle of green such as the artificial turf. The information regarding the typical video image of a football game may be used to derive a baseline still image that can be compared against the video. Should a percentage of the video frames have a small deviation from the baseline still image, then a football game may be presumed to be still ongoing. The on-screen display is another still image that may be used. While the game is ongoing, a still image may be obtained or captured and stored within the memory of the receiving device. In a period past the end time, if the on-screen display still indicates that a team name or score or clock is till present, then the football game is still ongoing.

Specialized channels may also be used to broadcast events. When the particular event is over, a slide or other visual indications of upcoming programs may be broadcast. Thus, a relatively easy comparison of the slide with a previous screen generation a screen capture of the game will reveal that a game has ended versus when a game has not ended.

In step 710, a visual cue is determined. The visual cue may be stored in a memory in a receiving device for comparison. This may be referred to as a baseline image. In step 712, if the visual cue in the baseline image is not present in the program content at the end time, step 714 ends the process. In step 712, if the visual cue is present at the end time, step 716 extends the recording time and continues recording the program. As mentioned above, step 712 may be performed in various manners including comparing a baseline still image to determine if a game clock is present, if team names are present, if the score is present, if other characteristics of the game such as turf, stripes, lines, or other visual indicators are present. An exact match is not required and several different cues may be used.

It should also be noted that different game types may be identified. For example, football, baseball, soccer and the like may all be matched to a particular set of cues that can be attributed to that particular game. Therefore, when the attributes of a particular game correspond to a saved set of cues, then the game may still be ongoing.

The pattern of the video broadcast stream may also be used as a content-associated characteristic. For example, sporting events typically are high-bit rate events. The broadcast stream then switches to a lower-bit rate after the game. The bit rate may be averaged out over a period of time and if a transition is seen where the bit rate changes (e.g., high to low), then that may be a sign that the sporting event is over. Thus, the recording end time of a recording event may be extended if a bit-rate change is not performed.

Figure 8:
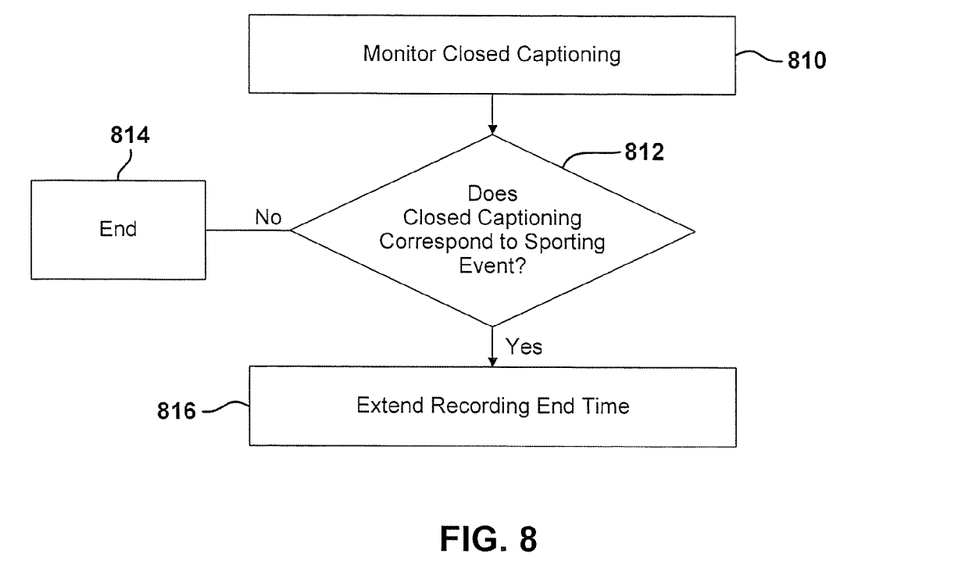
FIG. 8 is a flowchart of a method for extending a recording time in response to closed-captioning data.

Referring now to FIG. 8, closed-captioning data associated with the content may also be monitored for key words that are relevant to a sporting event. In step 810, the closed-captioning text is monitored for words or key words that are typically used for a particular sporting event. These words may correspond to a particular sporting event being recorded or may be general for all different types of sporting events. A histogram may be used to compare against all the words being broadcast in the closed-caption event. The words have a high correlation to the sporting event it can be assumed that the sporting event is still ongoing. In step 812, if the closed-captioning does not correspond to a sporting event at the scheduled end time of the recording, then step 814 ends the program. In step 812, if the closed-captioning does correspond to a sporting event, the recording time may be extended in step 816.

Figure 9:
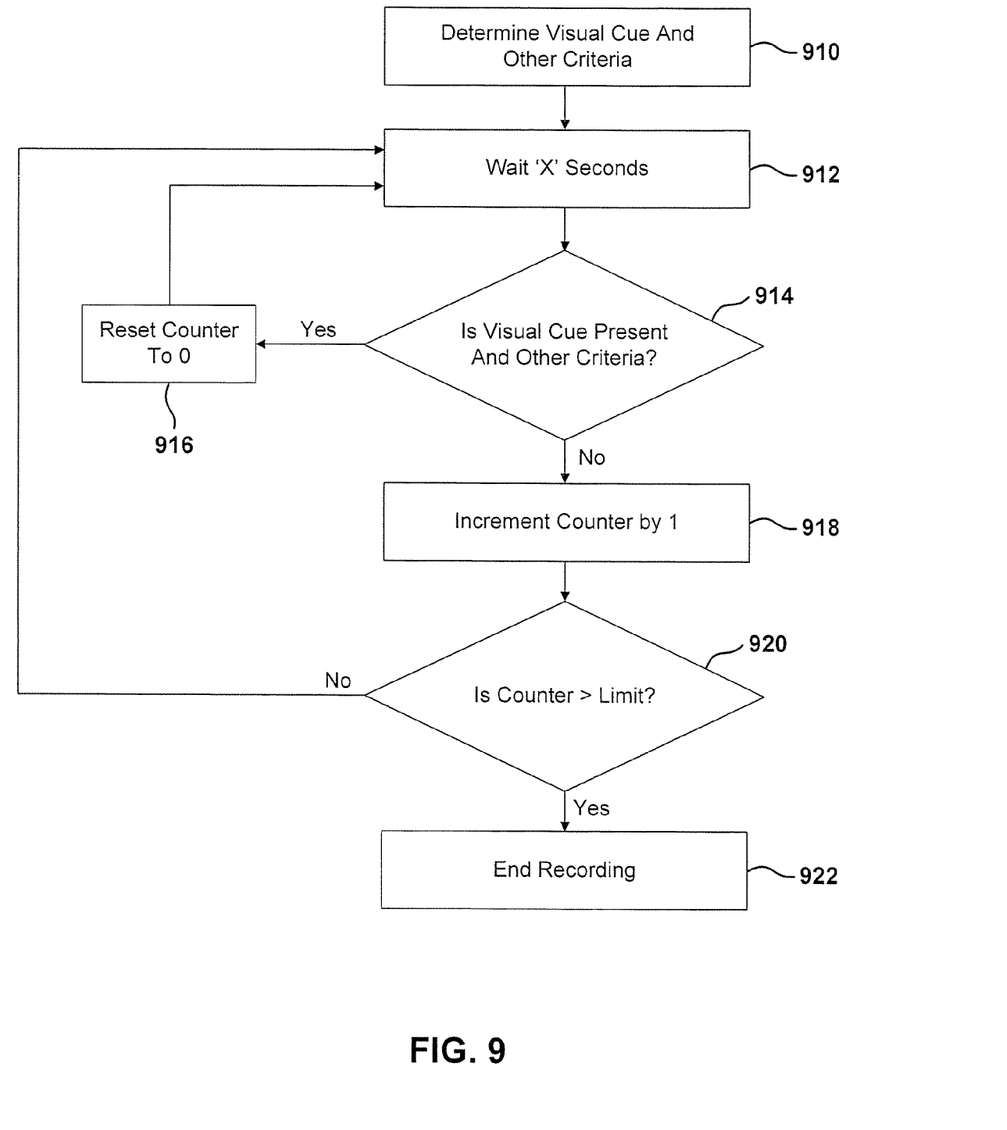
FIG. 9 is an alternate flowchart for a method of providing hysteresis in a recording time extension process.

Referring now to FIG. 9, an alternate method for those set forth in FIGS. 5-8 is set forth. In this embodiment, a type of hysteresis is placed into the system for determining whether or not to change the end time. In step 910, a visual cue, program guide data, broadcast stream data or closed-captioning data may be monitored to determine whether the particular program, such as a sporting event, is still on the air. In step 912, a period of "X" seconds may be waited. After step 912, step 914 determines whether the visual cue or other criteria are present. If they are present, the counter is resent to zero and again a counter is reset to zero in step 916. Another alternative in step 916 is to decrement the counter by an amount 'Y' such that after the program is over, if the triggers show up periodically, it won't cause the recording to be extended too far. The wait time of X seconds is then performed again in step 912. The loop of steps 912-916 are continually performed when the particular criteria is present. Of course, multiple criteria could be used to stay within the loop not just one of the criteria of FIGS. 5-8. If the visual cue is not present in step 914, the loop of steps 914-916 is out and a counter is incremented by one. If the counter is not above a limit, step 912 is again performed. In step 920, if the counter is above a limit, meaning that the visual cue or other criteria has not been present for an amount of time, then step 922 ends the recording. In step 920, the limit may correspond to a predetermined set time, or the like, to prevent commercials or other interruptions in a program from extending the recording time. The process described in FIG. 9 may be used with various combinations of elements. For example, a visual cue may be used with program guide data or visual cue may be used instead of guide data depending on different portions of the loop. As long as one of the program or content-associated characteristics is met, the loop may continue.

It should be noted that the above content-associated characteristics may be used together in various combinations or alone for determining whether to extend the recording event beyond the predetermined end time. Step 422 of FIG. 4 may perform one or more of the processes in FIGS. 5-8. The processes may be continually performed so that further extensions may be performed after the original recording event end time has passed. Thus, further extensions may be continually provided until the system, controller or receiving device determines the particular event has ended.

As mentioned above, the particular methods disclosed above may be used for reducing the end time as well. Thus, continual checks of the particular content stream may indicate, in a similar manner to that described above, that a particular sporting event or other live event has ended early or before the scheduled event end time. Combinations or the individual methods described above may be used in this determination in a similar manner to that for extending the times.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   generating a recording event request for content having a start time and a first end time;
   beginning storing content in a memory of the first receiving unit starting at the start time;
   when the recording device reaches the end time, reviewing an on-screen display within a video portion of the content to form a program-associated characteristic of the content in a program-associated characteristic recognition module of the first receiving unit; and
   when the program-associated characteristic corresponds to the content, indirectly determining a second end time using the program-associated characteristic and changing the first end time to the second end time later than the first end time.

2. A method as recited in claim 1 wherein storing content in a memory comprises storing content in a digital video recorder.

3. A method as recited in claim 1 wherein prior to generating a recording event request communicating first program guide data to a receiving device and comparing program guide data to the program associated characteristic.

4. A method as recited in claim 3 wherein communicating first program guide data comprises communicating first program guide data to the receiving device through a satellite.

5. A method as recited in claim 4 wherein the first program guide data comprises at least one selected from a program title, a program description, and a category name.

6. A method as recited in claim 1 wherein the on-screen display comprises at least one selected from a team name, a score, and game clock.

7. A method as recited in claim 1 wherein prior to storing content in a memory, receiving content from a terrestrial source at the first receiving unit.

8. A method as recited in claim 1 wherein prior to begin storing content in a memory, receiving content from a source on the Internet.

9. A receiving device comprising:
   a memory; and
   a controller generating a recording event request for content having a start time and a first end time, beginning storing content in a memory of the first receiving unit starting at the start time, when the end time is reached, reviewing an on-screen display within a video portion of the content to form a program-associated characteristic of the content in a program-associated characteristic recognition module, and when the program-associated characteristic corresponds to the content, indirectly determining a second end time using the program-associated characteristic and changing the first end time to second end time later than the first end time.

10. A receiving device as recited in claim 9 wherein the memory comprises a digital video recorder.

11. A receiving device as recited in claim 9 wherein the controller receives program guide data prior to generating a recording request and compares the program guide data to the program associated characteristic.

12. A receiving device as recited in claim 11 wherein the program guide data comprises at least one selected from a program title, a program description, and a category name.

13. A receiving device as recited in claim 9 wherein the on-screen display comprises at least one selected from a team name, a score, and game clock.

14. A receiving device as recited in claim 9 wherein the receiving device comprises a satellite television receiving device.

15. A method comprising:
- beginning electronically storing content in a memory of a first receiving unit starting at the start time of a recording event request, said recording event request having a first end time;
- electronically reviewing a broadcast stream pattern of the content in the first receiving unit for a transition between a high bit rate and a low bit rate;
- continually storing the content beyond the first end time until the transition; and
- when the broadcast stream pattern comprises the transition electronically changing, in the first receiving unit, the first end time to a second end time corresponding to the transition, said second end time being different than the first end time.

\* \* \* \* \*